United States Patent [19]

Sekine

[11] Patent Number: 5,657,080
[45] Date of Patent: Aug. 12, 1997

[54] PHOTOGRAPHING SYSTEM FOR DETECTING AND CORRECTING CAMERA SHAKE

[75] Inventor: Masayoshi Sekine, Tokyo, Japan

[73] Assignee: Canon Kabushiki Kaisha, Tokyo, Japan

[21] Appl. No.: 185,226

[22] Filed: Jan. 24, 1994

Related U.S. Application Data

[63] Continuation of Ser. No. 915,864, Jul. 20, 1992, abandoned, which is a continuation of Ser. No. 557,548, Jul. 24, 1990, abandoned.

[30] Foreign Application Priority Data

Jul. 26, 1989 [JP] Japan ................... 1-193771

[51] Int. Cl.$^6$ .................................. H04N 5/228
[52] U.S. Cl. ............................................. 348/208
[58] Field of Search .......................... 348/207, 208, 348/262, 336, 337, 340, 699, 700, 511; 359/554, 557; 354/70; H04N 5/228

[56] References Cited

U.S. PATENT DOCUMENTS

| 3,503,663 | 3/1970 | Cierva et al. ................ 350/16 |
| 4,623,930 | 11/1986 | Oshima et al. .............. 358/222 |
| 4,717,958 | 1/1988 | Gal et al. ................... 358/222 |
| 4,733,264 | 3/1988 | Hatase et al. ............... 354/430 |
| 4,755,876 | 7/1988 | Dangler ...................... 358/264 |
| 4,788,596 | 11/1988 | Kawakami et al. .......... 358/222 |
| 4,827,333 | 5/1989 | Iwabe . |
| 5,012,347 | 4/1991 | Fournier ..................... 358/222 |
| 5,020,890 | 6/1991 | Oshima et al. .............. 350/500 |
| 5,053,875 | 10/1991 | Ishii et al. ................... 358/222 |

FOREIGN PATENT DOCUMENTS

| 0149365 | 7/1985 | European Pat. Off. ....... H04N 5/228 |
| 0332169 | 9/1989 | European Pat. Off. ....... H04N 5/225 |
| 366136 | 5/1990 | European Pat. Off. ......... H04N 5/22 |

Primary Examiner—Andrew Faile
Assistant Examiner—Tuan V. Ho
Attorney, Agent, or Firm—Fitzpatrick, Cella, Harper & Scinto

[57] ABSTRACT

A photographing system for detecting and correcting camera shake in a camera having a photoelectric converting circuit for converting an optical image formed by an objective lens into an electrical signal includes a detecting device for detecting the shake of the photographing system. A deflecting device optically deflects the optical image on the basis of a detection signal from the detecting device. Shifting circuitry is provided for shifting an image received by the photoelectric converting circuitry, and a calculating circuit is provided for calculating the amount of shift of the image on the basis of the amount of deflection produced by the deflecting device. The photoelectric converting circuitry produces electrical signals corresponding to a plurality of color components, and the shifting circuitry processes at least one of the electrical signals on the basis of the result of the calculation by the calculating circuit. Thus, camera shake may be corrected by both optical and electrical correction.

8 Claims, 4 Drawing Sheets

PHOTOGRAPHING SYSTEM FOR DETECTING AND CORRECTING CAMERA SHAKE

This application is a continuation of application Ser. No. 07/915,864 filed Jul. 20, 1992, which is a continuation of Ser. No. 07/557,548, filed Jul. 24, 1990 both now abandoned.

BACKGROUND OF THE INVENTION

1. Field of the Invention

This invention relates to an image stabilizing photographing apparatus, and particularly to an image stabilizing photographing apparatus suitable for the image pickup optical system of a video camera, an electronic still camera or the like in which the movement of an image on the surface of an image pickup element (when the image pickup apparatus is inclined by vibration or the like) is corrected to thereby prevent blurred images.

2. Related Background Art

There have heretofore been proposed various image stabilizing apparatuses in which the movement of an image on the surface of an image pickup element caused by the vibration, inclination or the like of the image pickup apparatus is corrected so that a still image may be obtained.

For example, U.S. Pat. No. 3,212,420 proposes an image stabilizing apparatus in which, as shown in FIG. 2 of the accompanying drawings, a refraction type variable apex angle prism P is mounted forwardly of an image pickup optical system S and the apex angle of the variable apex angle prism P is varied correspond to the vibration of the image pickup apparatus to thereby deflect an image on an image pickup surface and correct the movement of the image.

In the method as shown in FIG. 2 wherein correction means by the variable apex angle prism is disposed forward of the image pickup optical system to thereby correct the movement of the image caused by the vibration of the image pickup apparatus, the presence of the color dispersion effect in the material of the variable apex angle prism would cause a chromatic difference of magnification proportional to the focal length f of the image pickup optical system S and the degree of dispersion of the variable apex angle prism P, thus deteriorating the imaging performance.

For example, when a light of any reference wavelength $\lambda_o$ deflected by the variable apex angle prism P passes through the variable apex angle prism P and thereafter enters the image pickup optical system S in parallel to the optic axis of the image pickup optical system S, a light of a different wavelength $\lambda_n$ (n=1, 2, 3, ...) enters the image pickup optical system S in the subsequent stage at an emergence angle of inclination $\tau_n$ (an included angle between the optic axis and the direction of incidence) (n=1, 2, 3, ...) corresponding to the degree of dispersion of the material of the variable apex angle prism P. The chromatic difference of magnification $\Delta y_n$ (n=1, 2, 3, ...) of the light of each wavelength $\lambda_n$ caused at this time by the influence of the variable apex angle prism P can be expressed by the following equation (1):

$$\Delta y_n = f \cdot \tan\tau_n$$

$$(n=1, 2, 3, \ldots) \quad (1)$$

Assuming at this time that, for example, as conditions for manual photographing by the use of a hand-held video camera, the angle of inclination θ of the deflected image corresponding to the shake of the apparatus with respect to the optic axis of the image pickup optical system S (hereinafter referred to as the compensation deflection angle) is 3°, the focal length f of the image pickup optical system S is 50 mm and use is made of silicone rubber in which the refractive indices of the refraction type variable apex angle prism P for R light (red: $\lambda_R \cong 610$ nm), G light (green: $\lambda_G \cong 530$ nm) and B light (blue: $\lambda_B \cong 460$ nm) are $n_R=1.4052$, $n_G=1.4097$ and $n_B=1.4141$, respectively, the chromatic difference of magnification $\Delta y_n$ between channels obtained from the above-mentioned equation (1) is $\Delta y_B=-28$ μm and $\Delta y_R=18$ μm with G light as the reference.

Generally, to maintain ordinary imaging performance, it is considered to be desirable that the width of the chromatic difference of magnification between channels be less than 5–10 μm.

Accordingly, the conventional method has suffered from the problem that, as described above, the chromatic difference of magnification is great and the imaging performance is deteriorated.

In contrast, Japanese Laid-Open Patent Application No. 61-223819 proposes an image stabilizing optical system having refraction type image deflecting means disposed forwardly of a photo-taking lens, and chromatic aberration correcting means for correcting aberration created by said refraction type image deflecting means.

However, this system has required an actuator such as a motor for driving said chromatic aberration correcting means eccentrically relative to the optic axis, which has led to the tendency that the entire apparatus including the optical system becomes bulky.

Also, the conventional variable apex angle prism has been formed of a visco-elastic material such as silicone rubber or liquid and therefore has encountered a great difficulty in following vibration of a high frequency (e.g. ten and several Hz or higher). This has led to the problem that good correction cannot be accomplished for image blur based on a minute vibration of high frequency components, for example, in the photographing from an automobile, a helicopter or the like.

On the other hand, U.S. Pat. No. 4,623,930 discloses a technique using an electrical means to stabilize an image formed on the image pickup surface of a CCD or the like against unexpected vibration.

SUMMARY OF THE INVENTION

It is a first object of the present invention to provide a photographing apparatus in which an image is optically stabilized and at the same time, an electrical image signal is processed to stabilize the image.

It is a second object of the present invention to provide a photographing apparatus in which the vibration of an image having relatively high frequency components which could not be completely corrected when an image was optically stabilized is electrically corrected.

It is a third object of the present invention to provide a photographing apparatus in which the derioration of an image based on chromatic aberration created by optical image deflecting means, for example, a variable angle prism, is prevented.

DESCRIPTION OF THE PREFERRED EMBODIMENTS

Figure 1:
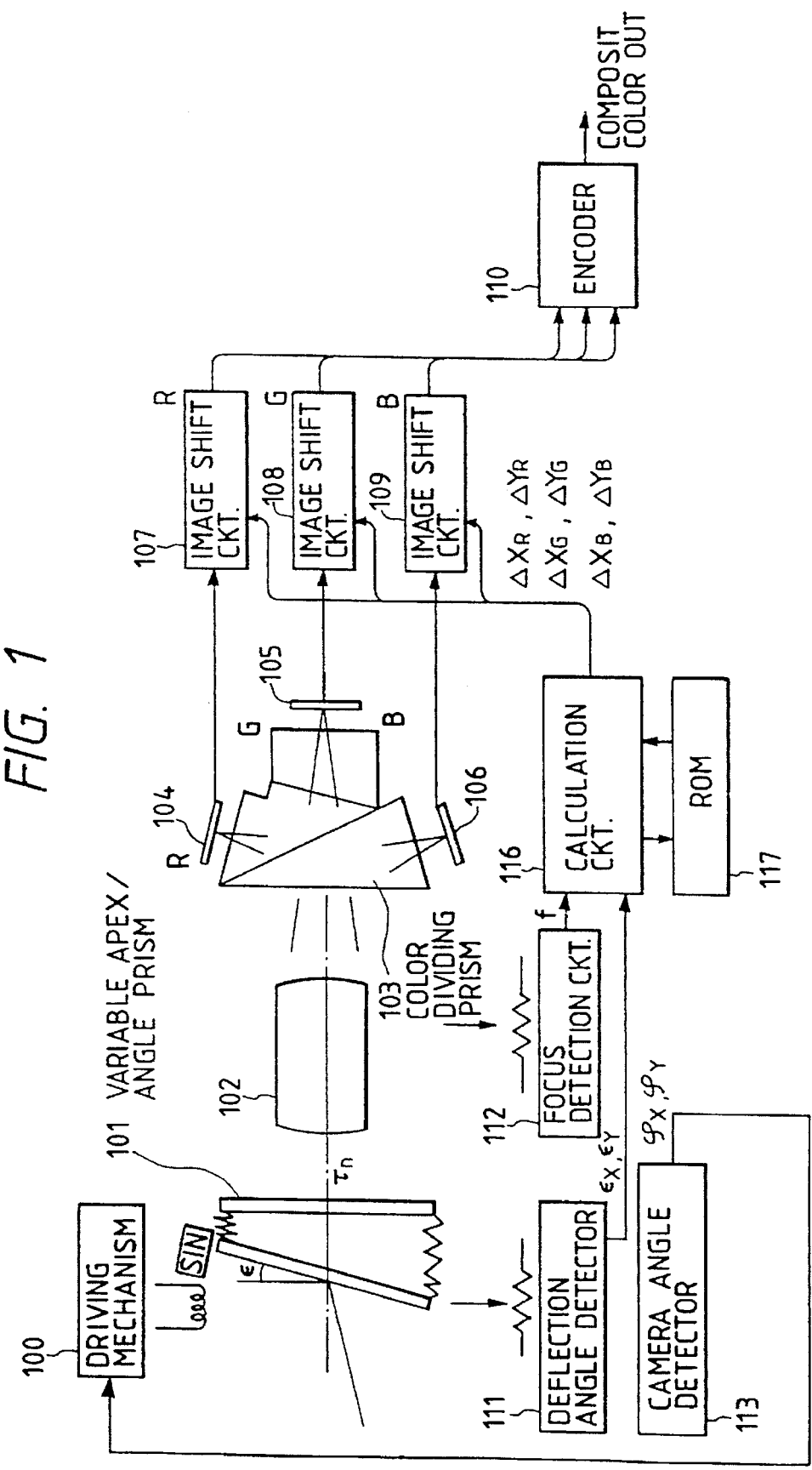
FIGS. 1 and 4 are schematic diagrams showing the essential portions of first and second embodiments, respectively, of the present invention.
Figure 2:
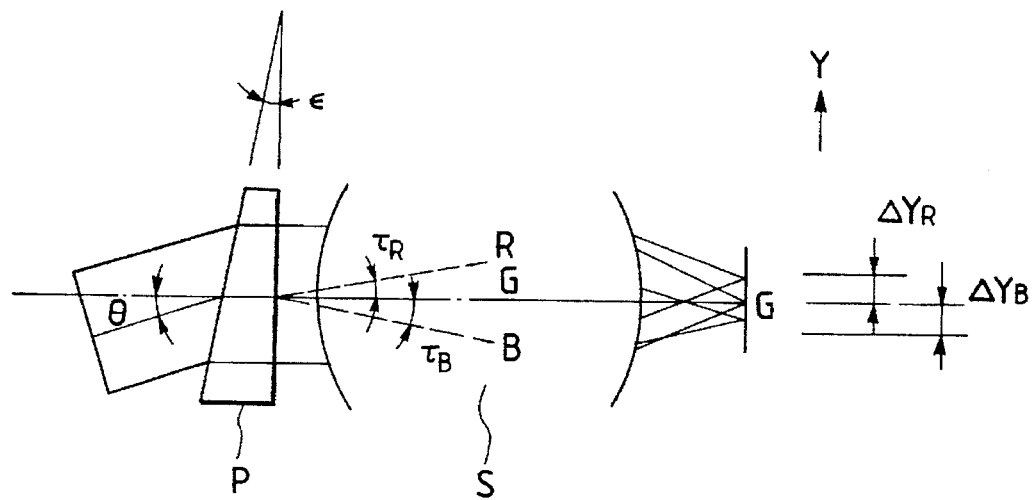
FIG. 2 illustrates the optical system of an image stabilizing photographing apparatus in which chromatic difference of magnification occurs.

FIG. 1 is a schematic diagram showing the essential portions of a first embodiment of the present invention as it is applied to a three-plate type CCD color camera (image pickup apparatus).

In FIG. 1, the reference numeral 101 designates a variable apex angle prism as optical image deflecting means.

The variable apex angle prism 101 is removably mounted forward of a photo-taking optical system 102 in such a manner that it is difficult for the other aberrations (distortion, etc.) than chromatic aberration to occur.

The photo-taking optical system 102 comprises a zoom lens.

The reference numeral 103 denotes a color dividing prism for dividing the light beam from the photo-taking optical system 102 into three color lights, i.e., red (R), green (G) and blue (B).

In the present embodiment, images based on the respective color lights are formed on the photosensitive surfaces of image pickup elements 104–106 each comprising a CCD by the photo-taking optical system 102 through the color dividing prism 103.

The reference numerals 107–109 designate image shift circuits as electronic image shift means corresponding to R light, G light and B light, respectively. Each of the image shift circuits 107–109 has an A/D converter, an image memory, a D/A converter, etc.

Images formed on the surfaces of the image pickup elements by the image pickup optical system 102 are converted into image information of each color light by the image pickup elements 104–106 and input to the image shift circuits 107–109. At this time, image memory read-out addresses are controlled by a calculation circuit 116, whereby the positions of the images are two-dimensionally shifted.

The reference numeral 113 denotes an angle sensor as a camera angle detector. The angle sensor 113 comprises a gyroscope or the like and detects angles of inclination $\phi_x$ and $\phi_y$ resulting from the vibration of the image pickup apparatus.

The reference numeral 100 designates driving means having, for example, a gimbals structure. The driving means 100 mechanically or magnetically drives the prism apex angles of the variable apex angle prism 101 in two x and y directions on the basis of output signals $\phi_x$ and $\phi_y$ from the camera angle detector 113.

The reference numeral 111 denotes a deflection angle detector which detects the apex angles of the variable apex angle prism 101 in the x direction and the y direction and outputs detection signals $\epsilon_x$ and $\epsilon_y$.

The reference numeral 112 designates a focal length detector which detects the focal length of the image pickup optical system 102 in a predetermined zoom position. The image pickup optical system 102 may be comprised of a lens system of a single focal length, and in this case, the focal length is constant. The reference numeral 116 denotes a calculation circuit which calculates the amount of image shift by a method to be described by the use of output signals from the deflection angle detector 111 and the focal length detector 112 and a signal from an ROM 117 storing therein the refractive indices $n_R$, $n_G$ and $n_B$ of the material of the variable apex angle prism 101 for the respective color lights R, G and B.

The reference numeral 110 designates an encoder which converts signals from the image shift circuits 107–109, for example, into standardized image signals of the NTSC type or the PAL type. The encoder 110 includes means for $\gamma$ correction, outline correction, white balance, etc.

A description will now be given of a method of correcting the movement of the image on the surfaces of the image pickup elements caused when the image pickup apparatus vibrates in the present embodiment.

First, in the present embodiment, the angles of inclination $\phi_x$ and $\phi_y$ caused by the vibration or the like of the image pickup apparatus are detected by the camera angle detector 113, and on the basis of the result of the detection, the apex angle of the variable apex angle prism 101 as the optical image deflecting means is varied by the driving means 100 to thereby correct the movement of the images.

That is, the optical image deflecting means two-dimensionally deflects the images formed on the respective image pickup elements 104–106 by the image pickup optical system 102, thereby optically correcting the movement of the images. At this time, the deviation of the images based on chromatic aberration created when the apex angle of the variable apex angle prism 101 is varied is shifted by electronic image shift means and is corrected thereby. That is, in the present embodiment, the image shift circuits 107–109 constituting the electronic image shift means effect image shift (trimming) two-dimensionally for each channel in accordance with the direction and angle of deflection of the optical image deflecting means and the focal length of the image pickup optical system 102.

In the present embodiemnt, the image signals of the CCD's 104, 105 and 106 are processed by the use of the shift circuits 107, 108 and 109 (image signal processing means), respectively, but in principle, the shift circuit 108 can be eliminated if the design is made such that the image of a certain channel, for example, the G channel, as the reference channel coincides with the images formed by the other two channels.

Let it be assumed that the amounts of image shift of the respective color lights in the X and Y directions relative to the image pickup elements 104–106 are $\Delta X_R$, $\Delta Y_R$, $\Delta X_G$, $\Delta Y_G$, $\Delta X_B$ and $\Delta Y_B$. These values are found by the calculation circuit 116 on the basis of the value of the apex angle of the variable apex angle prism 101 detected by the deflection detecting circuit 111, the value of the focal length of the image pickup optical system 102 detected by the focal length detector 112, and the values of the refractive indices $n_R$, $n_G$ and $n_B$ of the material of the variable apex angle prism 101 for the respective color lights stored in the ROM 117.

Figure 3:
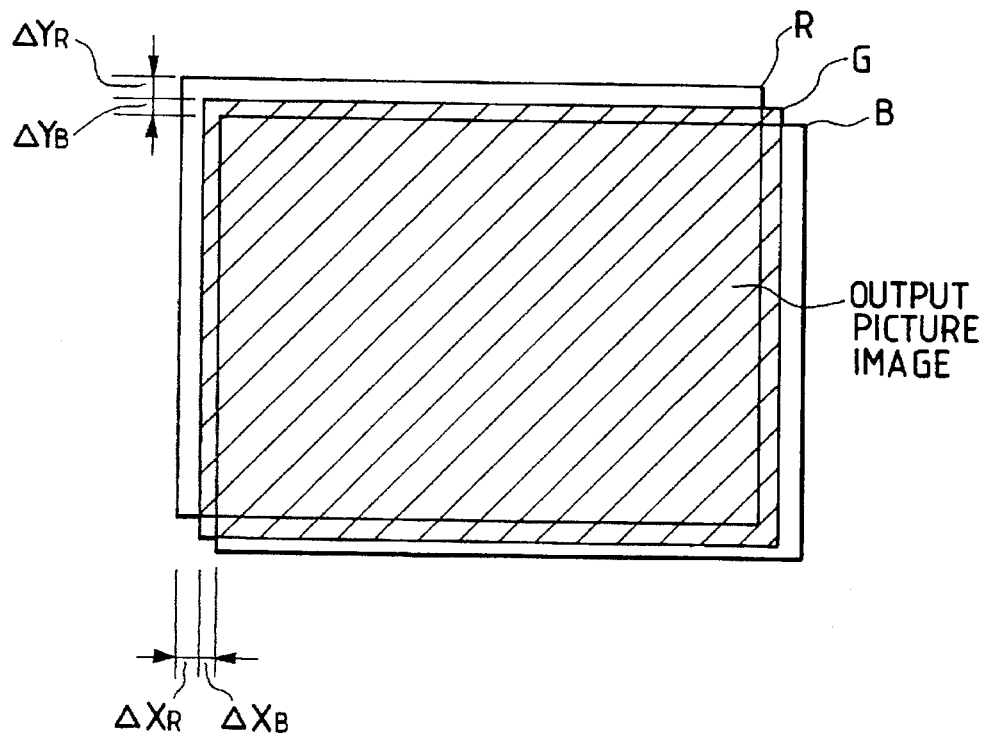
FIG. 3 is an illustration showing the positional relationship among the amounts of image shift.

FIG. 3 is an illustration showing an example of the positional relation among the then-existing amounts of image shift $\Delta X_R$, $\Delta Y_R$, $\Delta X_G$, $\Delta Y_G$, $\Delta X_B$ and $\Delta Y_B$.

When as previously described, the focal length of the image pickup optical system is f and the emergence angle of inclination from the variable apex angle prism is $\tau_n$, the chromatic aberration $\Delta y_n$ created by a variation in the apex angle of the variable apex angle prism 101 can be found by the aforementioned equation (1), i.e., $$\Delta y_n = f \cdot \tan \tau_n.$$

Accordingly, when the apex angles of the variable apex angle prism in the X direction and the Y direction are $\epsilon_x$ and $\epsilon_y$, respectively, and the refractive index of the material of the variable apex angle prism is n, the chromatic difference of magnification can be found from the equation (1).

So, the amounts of image shift $\Delta X_R$, $\Delta Y_R$, $\Delta X_G$, $\Delta Y_G$, $\Delta X_B$ and $\Delta Y_B$ are found by the calculation circuit 116 on the basis of the following equations:

$$\Delta X_R = f \cdot \tan\{(n_R - 1)\epsilon_x\}$$

$$\Delta Y_R = f \cdot \tan\{(n_R - 1)\epsilon_y\}$$

$$\Delta X_G = f \cdot \tan\{(n_G - 1)\epsilon_x\}$$

$$\Delta Y_G = f \cdot \tan\{(n_G - 1)\epsilon_y\}$$

$$\Delta X_B = f \cdot \tan\{(n_B - 1)\epsilon_x\}$$

$$\Delta Y_B = f \cdot \tan\{(n_B - 1)\epsilon_y\}$$

The image shift circuits 107–109 effect the shift of the images in conformity with the amounts of image shift found by the calculation circuit 116, and transmit the calculated image signals to the encoder 110.

The encoder 110 converts the signals from the image shift circuits 107–109 into standardized image signals of the NTSC type or the PAL type.

In the present embodiment, the chromatic difference of magnification created by the angle of deflection of the variable apex angle prism 101 is corrected in the manner described above, and as a whole, the movement of the images by the vibration of the image pickup apparatus is corrected well.

In the present embodiment, instead of the angle sensor, an angular velocity sensor may be used as the camera angle detector 113 to detect the angular velocity, and use may be made of the output signal thereof which has been integrated, or the angular acceleration which has been double-integrated.

Further, as proposed in Japanese Laid-Open Patent Application No. 61-269572, the design may be made such that the shake of the camera is detected from the image signal obtained by the image pickup apparatus, by an image processing circuit corresponding to the camera angle detector 113 and is corrected thereby.

Figure 4:
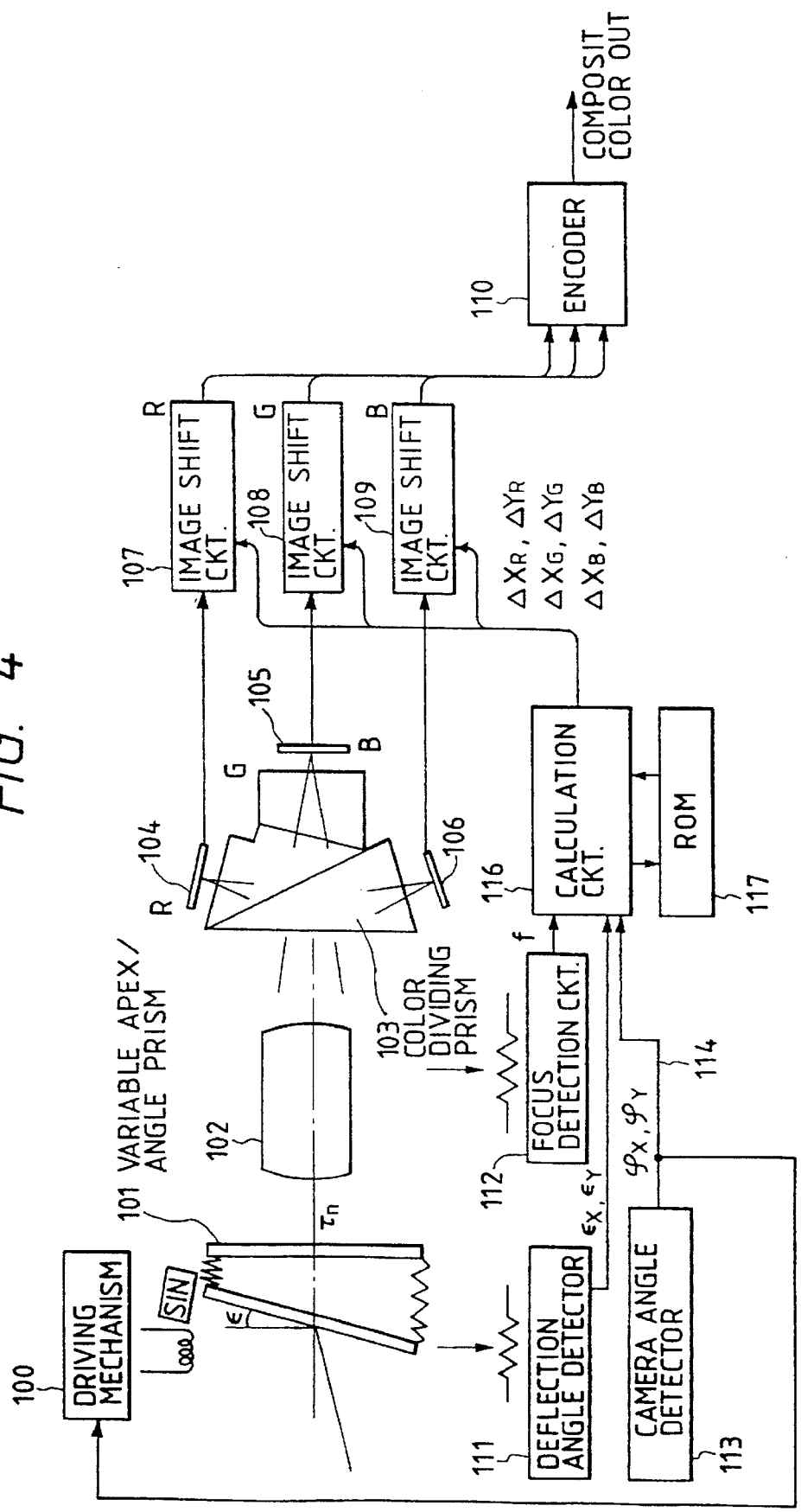

FIG. 4 is a schematic diagram showing the essential portions of a second embodiment of the present invention.

In this embodiment, a signal system is added to the embodiment of FIG. 1 to improve the image stabilizing characteristics of the image stabilizing image pickup apparatus.

Since the driving means 100 and the variable apex angle prism 101 are mechanically connected together, the frequencies which can respond to the detected vibration are low, e.g. up to the order of 10 Hz. Accordingly, it is difficult to effect correction for vibrations having a frequency component higher than this frequency.

So, in the present embodiment, the correction of the movement of images when the image pickup apparatus vibrates minutely at a high frequency, e.g. of 10 Hz or higher is effected by image-shifting all channels by the same amount in the same direction by the image shift circuits 107–109.

Generally, the vibration of the image pickup apparatus is great in amplitude for low frequency components (with 0–10 Hz) and small in amplitude for high frequency components (10 Hz or higher).

In the present embodiment, the movement of images of low frequency components and great amplitude is corrected chiefly by optical deflecting means and the movement of images of high frequency components and small amplitude is corrected by electronic image shift means and as a whole, the movement of images based on a wide range of oscillation frequency and amplitude is corrected.

In the present embodiment, the differences $(\phi_x - \epsilon_x)$ and $(\phi_y - \epsilon_y)$ between the output values $\phi_x$ and $\phi_y$ as the angles of inclination from the camera angle detector 113 and the angles of deflection $\epsilon_x$ and $\epsilon_y$ when the apex angle of the variable apex angle prism 101 is varied are information corresponding to the amount of the angle of deflection which the driving means 100 and the variable apex angle prism 101 could not completely follow.

So, in the present embodiment, the amount of deflection which the driving means 100 and the variable apex angle prism 101 could not completely follow, i.e., the under-corrected amount, is input to the calculation circuit 116 and the images are electronically shifted and corrected in the direction opposite to the minute vibration by the image shift circuits 107–109, whereby there are obtained images whose vibration has been precisely corrected even for high frequencies.

In the present embodiemnt, the amounts of image shift $\Delta X_R$, $\Delta Y_R$, $\Delta X_G$, $\Delta Y_G$, $\Delta X_B$ and $\Delta Y_B$ when the correction accompanying minute vibrations of high frequencies is effected simultaneously with the chromatic aberration correction of the first embodiment for the electronic image shift means are:

$$\Delta X_R = f \cdot \tan\{(n_R - 1)\epsilon_x + (\phi_x - \epsilon_x)\}$$

$$\Delta Y_R = f \cdot \tan\{(n_R - 1)\epsilon_y + (\phi_y - \epsilon_y)\}$$

$$\Delta X_G = f \cdot \tan\{(n_G - 1)\epsilon_x + (\phi_x - \epsilon_x)\}$$

$$\Delta Y_G = f \cdot \tan\{(n_G - 1)\epsilon_y + (\phi_y - \epsilon_y)\}$$

$$\Delta X_B = f \cdot \tan\{(n_B - 1)\epsilon_x + (\phi_x - \epsilon_x)\}$$

$$\Delta Y_B = f \cdot \tan\{(n_B - 1)\epsilon_y + (\phi_y - \epsilon_y)\}$$

Here, if the amounts of image shift reach too high values (several percent or more of the size of the picture plane), it will cause the breakage of the picture plane by an image shift, or the distortion or shading created by the image pickup optical system 102 will be observed as vibration on the output picture plane, thus causing the quality of image to be deteriorated. Therefore, in the present embodiment, it is preferable to provide limiter means for limiting the amounts of image shift so as to be of the order of several percent of the size of the picture plane.

Figure 5:
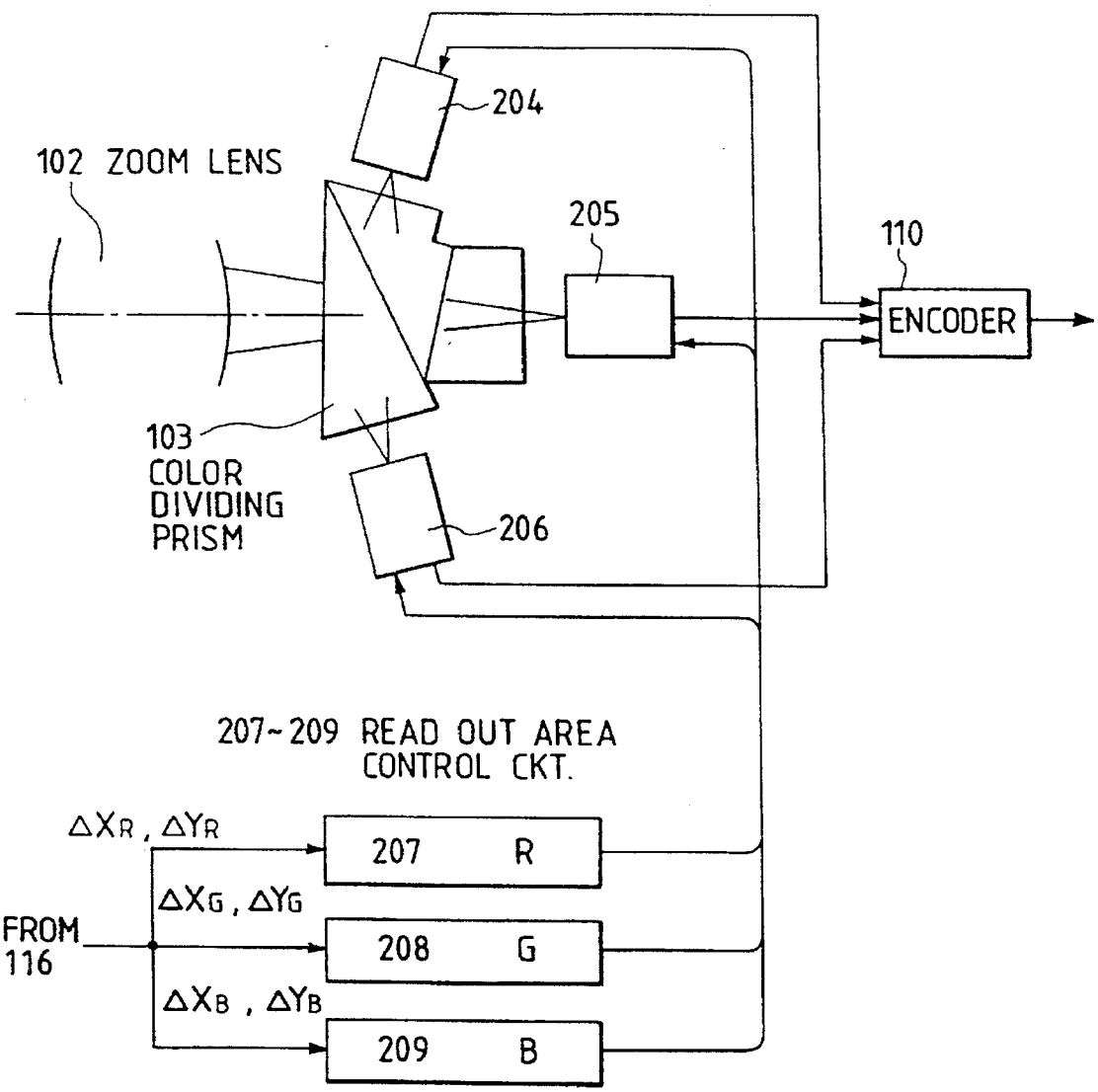
FIG. 5 is a schematic diagram showing some essential portions of a third embodiment of the present invention.

FIG. 5 is a schematic diagram of the essential portions neighboring the electronic image shift means of a third embodiment of the present invention.

In this embodiment, there is shown image shift means for directly controlling the read-out positions of image pickup elements. The reference numerals 204–206 designate image pickup elements such as CCD's or saticons, and the reference numerals 207–209 denote read-out area control circuits for controlling the read-out positions of images.

In the image pickup elements 204–206, the timing (the phase for each of three color lights) and scanning speed of the scanning signal of an electron beam are changed, whereby apparently the images can be minutely shifted.

In the present embodiment, the scanning signal is controlled on the basis of the amounts of image shift $\Delta X_R$, $\Delta Y_R$, $\Delta X_G$, $\Delta Y_G$, $\Delta X_B$ and $\Delta Y_B$ from the calculation circuit 116, not shown, to thereby obtain an effect similar to that of the second embodiment.

Also, in the solid state image pickup elements such as CCD's, the clocks of CCD transfer registers in the horizontal direction (H direction) and the vertical direction (V direction) are controlled, whereby apparently the images can be shifted by a technique similar to that proposed, for example, in U.S. Pat. No. 4,593,311.

Such image shift means can also be realized in a color camera of the one plate type.

That is, the image is read out by a conventional method, whereafter the image is divided into color lights R, G and B, which are input to the image shift circuits 107–109 of FIG. 1 and image shift is effected therein, whereby a similar effect can be obtained.

According to the present invention, there can be achieved an image stabilizing image pickup apparatus suitable for a video camera, a broadcasting hand-held camera or the like in which the movement of an image caused by the vibration or the like of the image pickup apparatus is corrected by the use of optical image deflecting means and electronic image shift means to thereby prevent a reduction in the resolving power of the image and which is made compact as a whole and yet can quickly and highly accurately correct the movement of the image, for example, of a wide range of oscillation frequencies.

Also, according to the present invention, there can be achieved an image stabilizing image pickup apparatus characterized in that the influence of the color dispersion of the material of a variable apex angle prism can be corrected well and therefore the use of VAP material of high refractive index becomes possible and that the VAP driving angle $\epsilon$ can be made small and driving means can readily be made compact.

I claim:

1. A phototaking system having converting means for converting an optical image formed by an objective lens into an electrical signal, said photographing system including:

detecting means for detecting the shake of said photographing system;

deflecting means for optically deflecting said optical image on the basis of a detection signal of said detecting means;

means for shifting an image formed by the converting means; and calculating means for calculating the amount of shift of said image on the basis of the amount of deflection produced by said deflection means, wherein the converting means produces electrical signals corresponding to a plurality of color components, and wherein said shifting means processes at least one of said electrical signals on the basis of the result of the calculation by said calculation means.

2. A phototaking system according to claim 1, wherein said deflecting means comprises a variable angle prism.

3. A phototaking system according to claim 1, further including producing means for producing the amount of shift of said image on the basis of a signal corresponding to the difference between the detection signal of said detecting means and a deflection signal corresponding to the amount of deflection produced by said deflection means.

4. A phototaking system according to claim 3, wherein said deflecting means comprises a variable angle prism.

5. A phototaking system for compensating for a fluctuation of an optical image produced by an objective lens, comprising:

(a) detection means for detecting the fluctuation of the optical image;

(b) deflecting means for optically deflecting the optical image based on an output of said detection means;

(c) a prism unit for dividing light flux from said objective lens into a plurality of color component light fluxes;

(d) conversion means for converting each color component light flux divided by said prism unit into an electrical signal; and (e) processing means for signal-processing electrical signals output by said conversion means so that a shift in the output of said conversion means caused by chromatic aberration generated by said deflection means is corrected.

6. A photographing system according to claim 5, wherein said deflecting means comprises a variable angle prism.

7. A phototaking system for compensating for a fluctuation of an optical image and having a conversion means for converting the optical image produced by an objective lens into an electrical signal, comprising:

(a) detection means for detecting the fluctuation of the optical image;

(b) deflection means for optically deflecting the optical image based on a detection signal of said detection means; and (c) processing means, coupled to said detection means, for processing the electrical signal of the conversion means so that a shift in the output of said conversion means caused by chromatic aberration generated by said deflection means is corrected.

8. A phototaking system according to claim 7, wherein said deflection means comprises a variable angle prism.

* * * * *

UNITED STATES PATENT AND TRADEMARK OFFICE
CERTIFICATE OF CORRECTION

PATENT NO. : 5,657,080
DATED : August 12, 1997
INVENTOR(S) : MASAYOSHI SEKINE It is certified that error appears in the above-identified patent and that said Letters Patent is hereby corrected as shown below:

Column 1

Line 32, "correspond" should read --corresponding--.
　　　Line 36, "correction" should read --the correction--.

Column 2

Line 58, "derioration" should read --deterioration--.

Column 3

Line 20, "is" should read --is more--.

UNITED STATES PATENT AND TRADEMARK OFFICE
CERTIFICATE OF CORRECTION

PATENT NO. : 5,657,080

DATED : August 12, 1997

INVENTOR(S) : MASAYOSHI SEKINE

It is certified that error appears in the above-identified patent and that said Letters Patent is hereby corrected as shown below:

Column 4

Line 5, "an" should read --a--.
Line 38, "embodiemnt," should read --embodiment--.

Column 6

Line 25, "embodiemnt," should read --embodiment--.

Column 8

Line 31, "photographing" should read --phototaking--.

Signed and Sealed this

Twelfth Day of May, 1998

BRUCE LEHMAN

*Attest:*

*Attesting Officer*           *Commissioner of Patents and Trademarks*